United States Patent
Nagafuchi et al.

[11] Patent Number: 6,145,297
[45] Date of Patent: Nov. 14, 2000

[54] GAS-TURBINE COMBUSTOR WITH LOAD-RESPONSIVE PREMIX BURNERS

[75] Inventors: Naoyuki Nagafuchi, Hitachi; Kazuyuki Ito, Hitachinaka; Yotaro Kimura, Hitachi, all of Japan

[73] Assignee: Hitachi, Ltd., Tokyo, Japan

[21] Appl. No.: 09/512,350

[22] Filed: Feb. 24, 2000

Related U.S. Application Data

[62] Division of application No. 08/979,322, Nov. 26, 1997.

[30] Foreign Application Priority Data

Nov. 27, 1996 [JP] Japan ................................. 8-331614

[51] Int. Cl.[7] ............................................. F02C 9/26
[52] U.S. Cl. ............................................. 60/39.281
[58] Field of Search ........................... 60/39.281, 739

[56] References Cited

U.S. PATENT DOCUMENTS

| | | | |
|---|---|---|---|
| 4,716,719 | 1/1988 | Takahashi et al. | 60/39.281 |
| 5,272,637 | 12/1993 | Urushidani et al. | 60/39.281 |
| 5,806,299 | 9/1998 | Bauermeister | 60/39.281 |

*Primary Examiner*—Louis J. Casaregola
*Attorney, Agent, or Firm*—Mattingly, Stanger & Malur, P.C.

[57] ABSTRACT

A gas-turbine combustor (1) provided with a plurality of premix burners (2-a, 2-b) and a diffusion burner (8) and capable of varying the number of the operating premix burners according to the variation of load thereon comprises fuel pipes (3-a, 3-b, 9) connected to the burners, flow control valves (4-a, 4-b, 10) placed respectively in the fuel pipes, a pressure control valves (6, 12) placed in fuel pipes (5, 11), a fuel distribution setting device (14) for controlling the respective openings of the flow control valves according to load, and a pressure ratio setting device (15) for controlling the respective openings of the pressure control valves when the condition of the flow control valves is changed.

3 Claims, 7 Drawing Sheets

FIG. 9

GAS-TURBINE COMBUSTOR WITH LOAD-RESPONSIVE PREMIX BURNERS

This is a divisional application of U.S. Ser. No. 08/979,322, filed Nov. 26, 1997.

BACKGROUND OF THE INVENTION

1. Field of the Invention

The present invention relates to a fuel flow controller for a gas-turbine combustor provided with a plurality of premix burners.

2. Description of the Related Art

Recent gas turbines trend to increase the ratio of premix combustion to diffusion combustion to reduce Nox emission of the gas-turbine combustor. Premix combustion, as compared with diffusion combustion, is effective in reducing the production of Nox and, on the other hand, narrows the range of stable combustion. It is important to develop a gas-turbine combustor capable of operating in the predetermined range of fuel-air ratio for premix combustion to ensure the stable operation of a gas turbine in the entire range of operating load.

Generally, a gas turbine operates in a diffusion combustion mode in a low-load period from the start of operation to a low-load operating state in which the gas turbine operates under a low load in the range of 5 to 35% of the rated load in which stable premix combustion can be sustained, and the ratio of premix combustion is increased gradually as the load on the gas turbine increases from the low load to the rated load. Therefore, the emission of Nox during low-load operation may be reduced by employing a premix combustion arrangement provided with a plurality of premix burners and capable of realizing conditions for stable combustion during low-load operation. Such a premix combustion arrangement requires the development of a gas controller for controlling the flow rates of the gas to be supplied to the plurality of premix burners.

An invention disclosed in JP-A No. 6-257748 provides a method of controlling the supply of fuel to a plurality of combustion chambers by a fuel controller comprising at least one fuel control trim valve, an orifice connected in series to the fuel control trim valve, and a fuel orifice connected in parallel to the fuel control trim valve.

OBJECTS AND SUMMARY OF THE INVENTION

Conventionally, a gas turbine provided with a plurality of premix burners performs fuel change more frequently and needs more time to reach a rated operating condition than a gas turbine provided with a single premix burner, which makes the output of the plant vary greatly and increases unburned gas. The plurality of premix burners cause the variation of the amount of fuel supplied to the premix burners in which combustion is sustained due to the pressure variation of the fuel supplied, whereby the possibility of unstable combustion, flashback, blowout or combustion oscillation is increased.

It is difficult to suppress the pressure variation of the fuel supplied due to fuel change even by the invention disclosed in JP-A No. 6-257748.

It is an object of the present invention to suppress the variation of the output of a plant to reduce unburned fuel and to avoid unstable combustion during fuel change for a premix burner.

According to a first aspect of the present invention, a combustor provided with a plurality of burners and capable of varying the number of the operating burners according to the variation of load thereon comprises:

fuel pipes connected to the burners;

flow control valves placed respectively in the fuel pipes;

a main fuel pipe for distributing fuel to the plurality of fuel pipes;

a pressure control valve placed in the main fuel pipe to control pressures in the fuel pipes; and a pressure controller for controlling the opening of the pressure control valve placed in the main fuel pipe connected to the fuel pipes provided with the flow control valves by a predetermined special control procedure different from a normal control procedure while the openings of the flow control valves of the fuel pipes connected to the burners to be started or stopped are varied when the number of the operating burners is changed.

According to a second aspect of the present invention, a combustor provided with a plurality of premix burners and one diffusion burner, and capable of varying the number of the operating premix burners according to the variation of load thereon comprises:

fuel pipes connected to the burners;

flow control valves placed respectively in the fuel pipes;

pressure control valves placed in a fuel pipe for supplying fuel to the diffusion burner, and in a premix fuel pipe for supplying fuel to the fuel pipes for the premix burners, respectively, to control pressures in the fuel pipes;

a fuel distribution ratio setting device for controlling the respective openings of the flow control valves according to load; and a pressure ratio setting device for controlling the opening of the pressure control valve placed in the premix main fuel pipe by a predetermined control procedure when the number of the operating burners is changed.

In the foregoing combustor according to the present invention, the pressure ratio setting device holds each of the pressure control valves at a predetermined opening in a period in which the opening of the flow control valve for supplying the fuel to one of the premix burners varies from zero to a predetermined value when adding premix combustion by the premix burner to diffusion combustion by the diffusion burner.

According to a third aspect of the present invention, a combustor provided with a plurality of premix burners and one diffusion burner, and capable of varying the number of the operating premix burners according to the variation of load thereon comprises:

fuel pipes connected to the burners;

fuel flow control valves placed respectively in the fuel pipes;

pressure control valves placed in a main fuel pipe connected to the fuel pipes for the premix burners and the fuel pipe for the diffusion burner, respectively, to control pressures in the fuel pipes;

a fuel distribution ratio setting device for controlling the respective openings of the flow control valves according to load; and a pressure ratio setting device for controlling the respective openings of the pressure control valves by a predetermined control procedure when the number of the operating premix burners is changed.

In the foregoing combustor according to the present invention, the pressure ratio setting device varies the opening of each of the pressure control valves at a predetermined rate in a period in which the opening of each of the flow control valves for supplying the fuel to the premix burners to be started or to be stopped is varied between zero and a predetermined value when increasing or decreasing the number of the operating premix burners from the number of the operating premix burners in a premix combustion mode in which the diffuse burner and a predetermined number of the premix burners are in operation.

In the foregoing combustor according to the present invention, the pressure ratio setting device controls the opening of the pressure control valve so as to suppress pressure variation in the fuel pipe in a period in which the opening of each of the flow control valves for supplying the fuel to the premix burners to be started or to be stopped when increasing or decreasing the number of the operating premix burners from the number of the operating premix burners in a premix combustion mode in which the diffuse burner and a predetermined number of the premix burners are in operation.

According to the present invention, when holding constant the opening of each of the flow control valves for controlling fuel supply to the premix burners operating at a predetermined fuel-air ratio, and increasing or decreasing the opening of each of the flow control valves for controlling fuel flow to the premix combustors to be started or to be stopped, the opening of each of the premix pressure control valves is varied at an optional rate so as to absorb pressure variation in the fuel pipe caused by the variation of the flow of the fuel. Therefore, the variation of fuel supply pressure which occurs when varying the flow of the fuel to the premix combustor can be suppressed in a short time and, therefore, the rated operating condition or the stopped condition of the combustor can be achieved in a short time to suppress the variation of the output of the plant.

Unstable burning in the premix burners during the variation of fuel flow to the premix burners can be avoided and the amount of unburned gas can be reduced by holding the fuel-air ratio of the mixture supplied to the operating premix combustors constant.

The pressure variation in the premix burners and the pressure variation in the diffusion burner can be made to cancel out each other by using the single pressure control valve placed in the main fuel pipe connected to the fuel pipes connected to the premix burners and the diffusion burner, and pressure variation in the pipes can be suppressed in a short time, the total flow of the fuel between the pressure control valve and each of the flow control valves varies in a narrow range and hence stable fuel supply can be achieved.

DETAILED DESCRIPTION OF THE PREFERRED EMBODIMENTS

Figure 1:
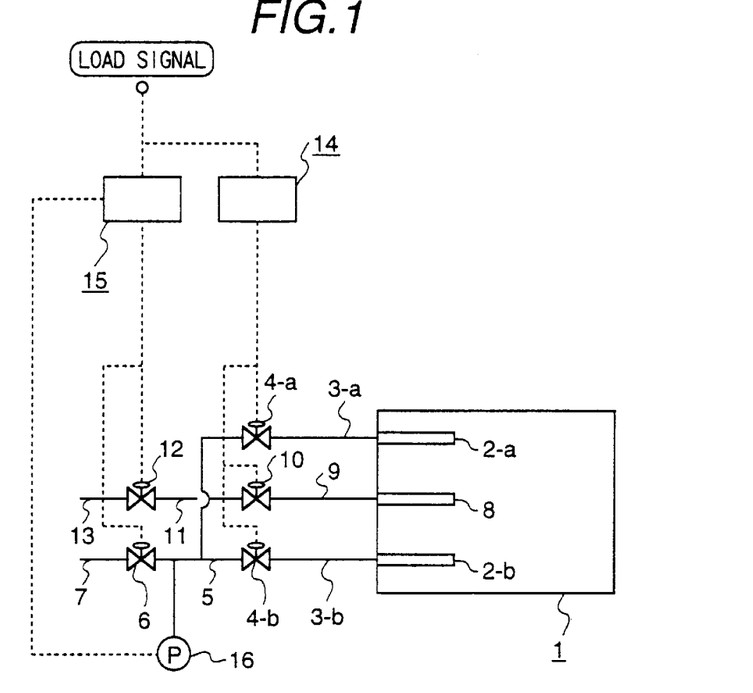
FIG. 1 is a diagrammatic view of a gas-turbine combustor in a preferred embodiment according to the present invention.

Referring to FIG. 1 showing a fuel flow controller included in a gas-turbine combustor 1 in a preferred embodiment according to the present invention, the gas-turbine combustor 1 has a single diffusion burner and two premix burners. A fuel distribution ratio setting device 14 provides a fuel flow control signal to control the respective openings of flow control valves 4-$a$, 4-$b$ and 10 for flow control. A pressure ratio setting device 15 provides a pressure control signal to control pressures in pipes by controlling pressure control valves 6 and 12. A pressure gauge 16 is connected to the exit side of the premix pressure control valve 6. The gas-turbine combustor 1 is provided with a single diffusion nozzle 8 and two premix nozzles 2-$a$ and 2-$b$. Pipes 9, 11 and 13 are connected to the diffusion nozzle 8, the flow control valve 10 and the pressure control valve 12 are interposed between the pipes 9 and 11 and between the pipes 11 and 13, respectively. Pipes 3-$a$, 3-$b$, 5 and 7 are connected to the premix nozzles 2-$a$ and 2-$b$ as shown in FIG. 1. The flow control valves 4-$a$ and 4-$b$ are interposed between the 3-$a$ and 5 and between the pipes 3-$b$ and 5, respectively. The premix pressure control valve 6 is interposed between the pipes 5 and 7. The pipe 7 is a main premix fuel pipe for supplying the fuel through the pipes 3-$a$ and 3-$b$ to the premix nozzles 2-$a$ and 2-$b$.

The pressure control valve 12 adjusts the pressure of the fuel of a supply pressure supplied thereto through the pipe 13 to a predetermined pressure, the fuel of the predetermined pressure flows through the pipe 11 to the flow control valve 10, the flow control valve 10 adjusts the flow of the fuel to a predetermined flow, and the fuel is supplied at the predetermined flow to the diffusion nozzle 8 for combustion in the gas-turbine combustor 1. The opening of the pressure control valve 12 is regulated on the basis of a pressure control signal provided by the pressure ratio setting device 15, and the opening of the flow control valve 10 is regulated on the basis of a flow control signal provided by the fuel distribution ratio setting device 14.

Meanwhile, the premix pressure control valve 6 adjusts the pressure of the fuel of a supply pressure supplied thereto through the pipe 7 to a predetermined pressure. The pressure gauge 16 connected to the pipe 5 measures the pressure of the fuel adjusted by the premix pressure control valve 6 and gives a control signal representing the measured pressure of the fuel to the pressure ratio setting device 15. The fuel of the predetermined pressure is distributed by the pipe 5 to the flow control valves 4-$a$ and 4-$b$. The flow control valves 4-$a$ and 4-$b$ control the flow of the fuel so that the fuel is supplied at predetermined flows through the pipes 3-$a$ and 3-$b$ to the premix nozzles 2-$a$ and 2-$b$ for combustion in the gas-turbine combustor 1. The respective openings of the flow control valves 4-$a$ and 4-$b$ are regulated on the basis of a flow control signal provided by the fuel distribution ratio setting device 14. A load signal representing load on the plant is given to the fuel distribution ratio setting device 14 and the pressure ratio setting device 15, and opening signals corresponding to operating condition are given to the premix pressure control valve 6 and the flow control valves 4-$a$, 4-$b$ and 10.

The fuel distribution ratio setting device 14 and the pressure ratio setting device 15 will be described in detail with reference to FIGS. 2, 3, 4 and 5.

Figure 2:
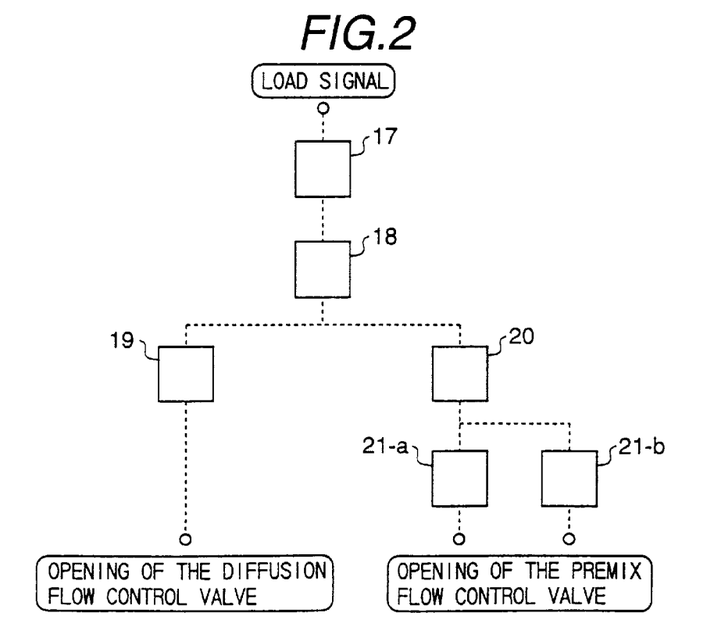
FIG. 2 is a block diagram of a fuel distribution ratio setting device employed in the present invention.

Referring to FIG. 2 showing the fuel distribution ratio setting device 14, a fuel signal converter 17 converts a load signal representing load on the plant into a fuel flow signal and gives the fuel flow signal to a premix fuel ratio calculator 18. Predetermined premix-diffusion fuel distribution ratios respectively corresponding to loads are set in the premix fuel ratio calculator 18. The premix fuel ratio calculator 18 provides fuel flow signals specifying flows of the fuel to be supplied to the premix burners and the diffusion burner. One of the output signals of the premix fuel ratio calculator 18 is given to a valve opening signal generator 19, and then the valve opening signal generator 19 provides a valve opening signal specifying an opening for the flow control valve 10 corresponding to the fuel flow signal. The other output signal of the premix fuel ratio calculator 18 is given to a premix fuel flow distributor 20 for the premix burners. Distribution ratios for the premix burners respectively corresponding to loads are stored in the premix fuel flow distributor 20. The premix fuel flow distributor 20 gives opening signals to opening signal generators 21-*a* and 21-*b*. The opening signal generators 21-*a* and 21-*b* give opening signals to the fuel control valves 4-*a* and 4-*b*.

Figure 3:
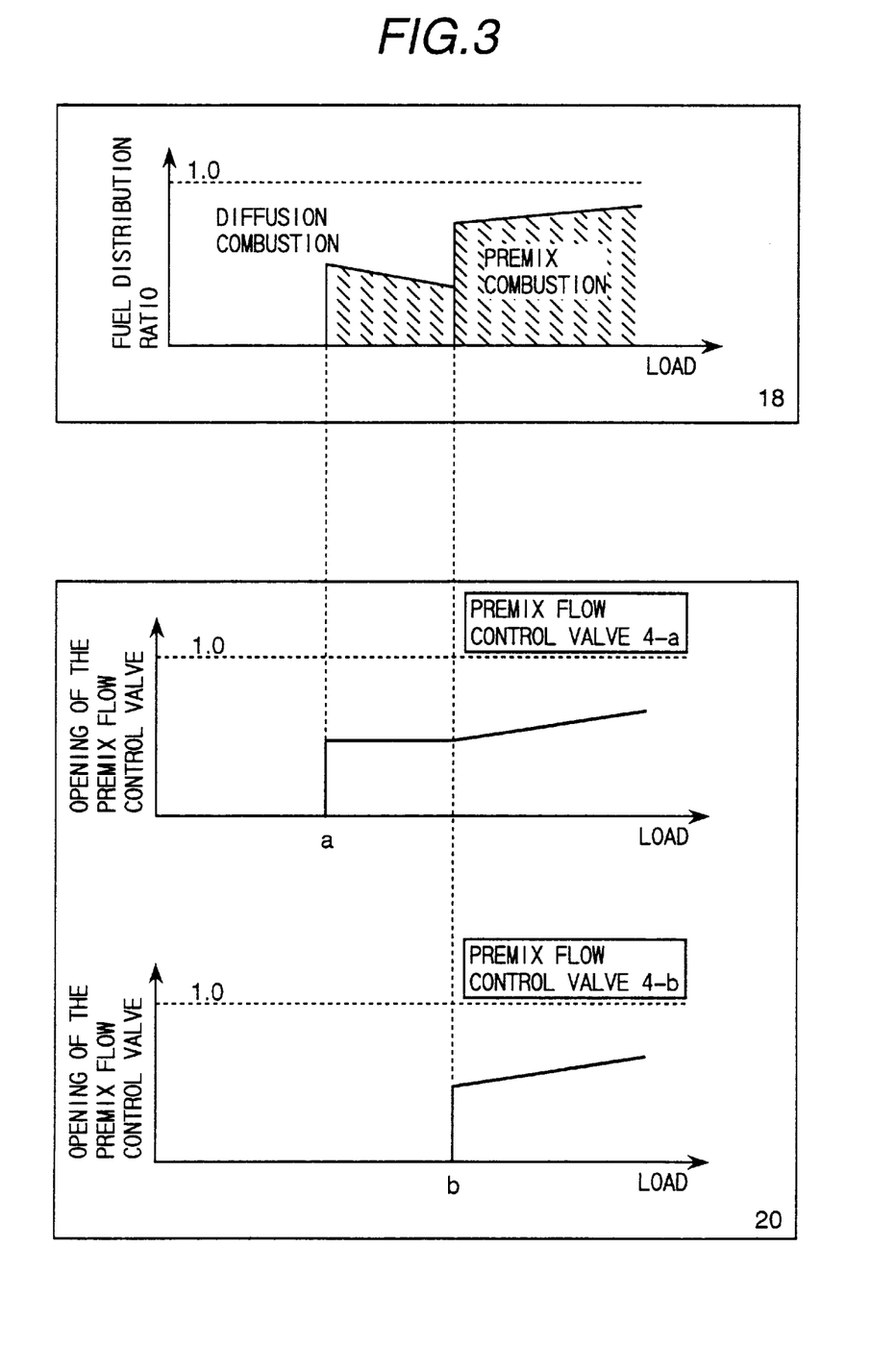
FIG. 3 is diagrams showing the variations of set values set by a premix fuel ratio calculator and a fuel flow distributor for premix burners employed in the present invention with load.

FIG. 3 is diagrams typically showing set values corresponding to load and set by the premix fuel ratio calculator 18 and the premix fuel flow distributor 20 shown in FIG. 2. In FIG. 3, the upper graph shows the variation of the set premix-diffusion fuel distribution ratio with load, and the lower graphs shown the variation of set openings for the flow control valves 4-*a* and 4-*b* shown in FIG. 1 with load. In a period where the load varies from a load zero to a load a, the gas-turbine combustor 1 operates in a diffusion combustion mode in which the fuel is supplied only through the diffusion flow control valve 10 for only diffusion combustion. In a period where the load varies from the load a to a load b, the gas-turbine combustor 1 operates in a diffusion-dominant combustion mode in which the fuel is supplied through the diffusion flow control valve 10 and the premix flow control valve 4-*a*, the premix flow control valve 4-*a* is kept at a fixed opening and the opening of the diffusion flow control valve 10 is increased with the increase of load. Upon the increase of the load to the load b, the premix flow control valve 4-*b* is opened at a predetermined opening and the gas-turbine combustor 1 starts operating in a premix-dominant combustion mode in which both the premix burners operate for combustion. In a period in which the load increases gradually from the load b toward the rated load, the ratio of premix combustion is increased gradually. If necessary, the diffusion flow control valve 10 may be closed and the gas-turbine combustor 1 may operate in a premix combustion mode in which only premix combustion is performed for the further reduction of Nox emission.

Figure 4:
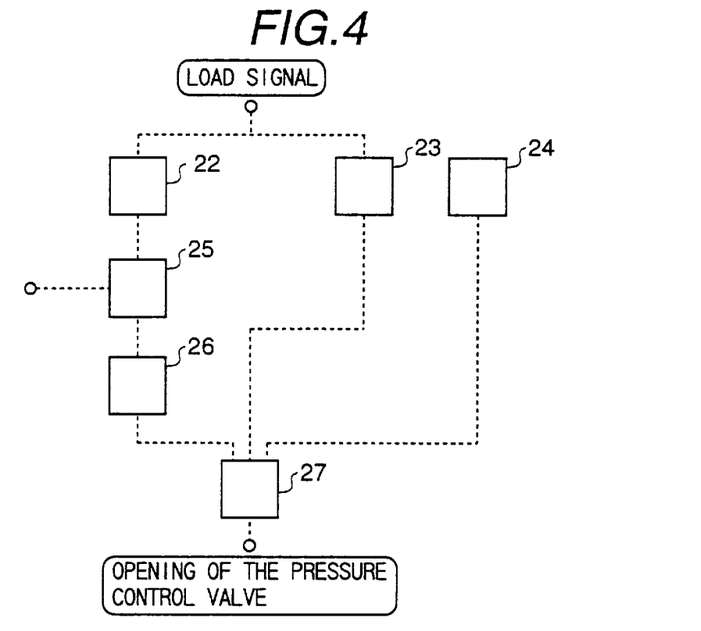
FIG. 4 is a block diagram of a pressure ratio setting device employed in the present invention.

Referring to FIG. 4 showing the pressure ratio setting device 15, a load signal representing load on the plant is given to a supply pressure setting device 22 and a fuel supply mode deciding device 23. The supply pressure setting device 22 provides a signal representing a set supply pressure corresponding to the load signal. A subtractor 25 gives a differential signal representing the difference between the pressure measured by the pressure gage 16 and the set supply pressure to a PI controller 28. The PI controller 26 provides signals representing variations to be made in the openings of the pressure control valves 6 and 12 to reduce the differential signal provided by the subtractor 25 to zero. The fuel supply mode deciding device 23 decides whether fuel supply to the premix burners is to be started or whether fuel supply to the premix burners is to be stopped, and whether the premix burners are to be operated on the basis of a set value corresponding to the load signal.

For example, the fuel supply mode deciding device 23 examines the load signal and decides whether or not the load represented by the load signal coincides with a fuel supply mode changing load, i.e., a load which requires the increase or decrease of operating burning systems to which the fuel is supplied.

Optimum set values are stored in an opening change rate setting device 24 for a state in which the premix burners are operated partly in addition to diffusion combustion, and a state in which where the fuel is supplied to all the premix burners as shown in FIG. 3. In a state where any fuel supply mode change signal is not provided by the fuel supply mode deciding device 23, the subtractor 25 which receives the output signal of the pressure gage 16 processes the output signal of the supply pressure setting device 22, and gives a signal representing the results of operation to the PI controller 26. The output of the PI controller 26 is transferred through a switch 27 to the pressure control valves 6 and 12 shown in FIG. 1. In a state where a fuel supply mode change signal is provided by the fuel supply mode deciding device 23, the output of the opening change rate setting device 24 is transferred through the switch 27 to the pressure control valves 6 and 12.

Figure 5:
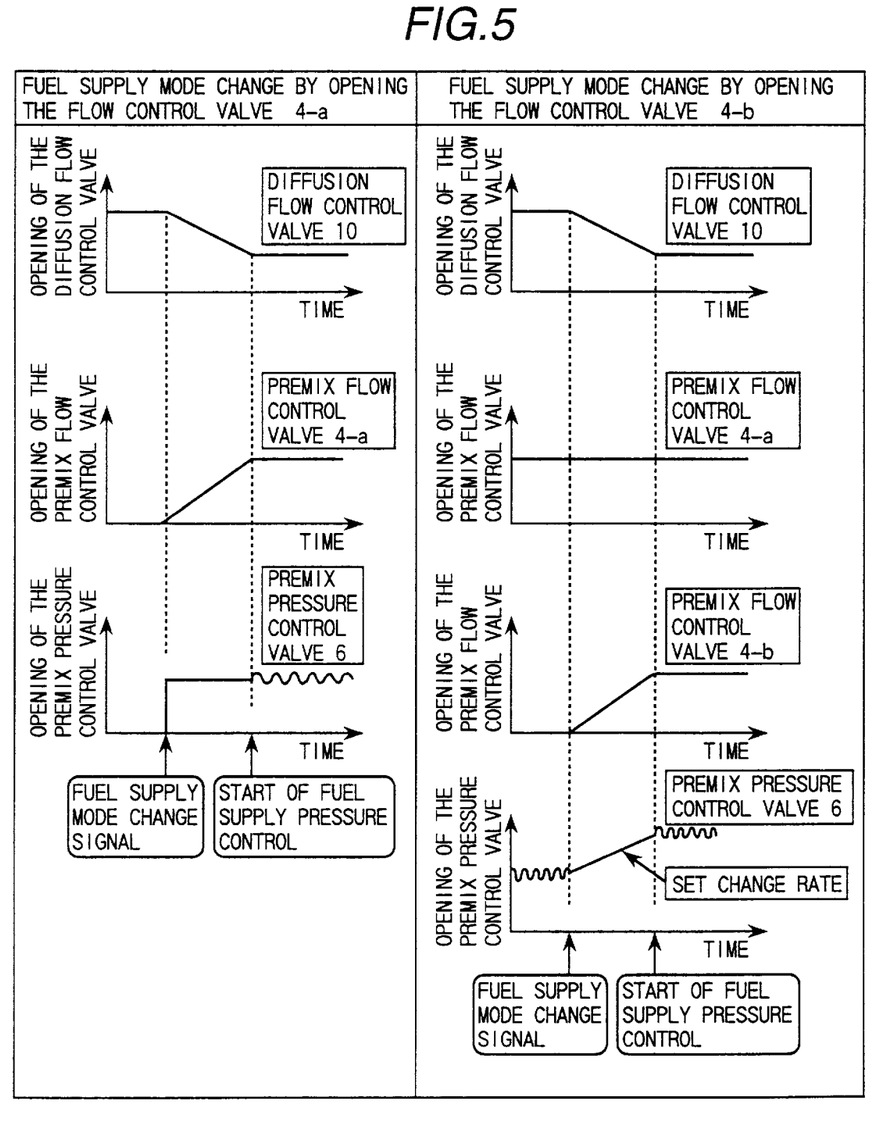
FIG. 5 is diagrams showing set values set by the pressure ratio setting device.

FIG. 5 shows set values set by the pressure ratio setting device 15. If the fuel supply mode deciding device 23 decides supplying the fuel to part of the premix burners, the premix flow control valves 4-*a* and 4-*b*, the diffusion flow control valve 10 and the premix pressure control valve 6 are regulated by a fuel supply mode change signal provided by the fuel supply mode deciding device 23 in modes expressed by diagrams on the left-hand side in FIG. 5.

Upon the start of opening of the premix flow control valve 4-*a*, the fuel supply mode deciding device 23 provides a signal to operate the switch 27 so as to select the opening change rate setting device 24 and a signal is given to the premix pressure control valve 6 so that the set value provided by the opening change rate setting device 24 is held forcibly constant until the opening of the premix flow control valve 4-*a* stops varying. Consequently, the opening of the premix pressure control valve 6 is kept constant during the period. After the opening of the premix flow control valve 4-*a* has increased to a desired opening, the switch 27 is returned to a position for starting the supply pressure control operation of the PI controller 26. The supply pressure control operation of the PI controller 26 causes the supply pressure controlled by the premix supply pressure control valve 6 to pulsate.

If the fuel supply mode deciding device 23 decides that all the premix burners are to be operated (the number of the operating premix burners is to be increased, if any premix burner has been in operation) and provides a fuel supply mode change signal to that effect, the premix flow control valves 4-*a* and 4-*b*, the diffusion flow control valve 10 and the premix pressure control valve 6 are controlled in modes expressed by diagrams on the right-hand side in FIG. 5.

The opening of the premix flow control valve 4-*a* connected to the premix burner 2-*a* which has been in operation is kept constant, the switch 27 is operated by the output signal of the fuel supply mode deciding device 23 so as to connect the opening change rate setting device 24 to the premix pressure control valve 6 to give a predetermined set opening change rate to the premix pressure control valve 6 until the opening of the premix flow control valve 4-*b* changes from zero to a desired opening or to a substantially full opening. Therefore, during this period, the premix pressure control valve 6 operates at the predetermined opening change rate. The opening change rate setting device 24 sets an opening change rate so that pressure variation in the pipe 5 caused by the fuel flowing through the premix flow control valve 4-*b* is absorbed. For example, the predetermined rate opens the pressure control valve in expectation of pressure drop in the fuel pipe due to the sudden increase of the flow rate of the fuel. Thus pressure variation is suppressed.

More specifically, the opening of the premix flow control valve 6 can be changed to a desired opening at a fixed change rate when the desired opening of the premix flow control valve 6 for a combustion mode in which the diffusion nozzle 8 and the premix nozzle 2-*a* are in operation for combustion is changed to a desired opening of the premix flow control valve 6 to a combustion mode in which the diffusion nozzle 8 and the premix nozzles 2-*a* and 2-*b* are in operation for combustion.

The switch 27 is operated so as to start supply pressure control operation using the output of the PI controller 26 upon the increase of the opening of the premix flow control valve 4-*b* to a desired opening or to a fixed opening. The supply pressure control operation of the PI controller 26 causes the supply pressure controlled by the premix supply pressure control valve 6 to pulsate.

A supply pressure control operation similar to the foregoing supply pressure control operation is carried out when the fixed opening of the premix flow control valve 4-*b* is decreased to zero. In this case, the opening of the premix pressure control valve 6 is decreased at a predetermined change rate during the closing operation of the flow control valve.

Thus, in this embodiment, when the opening of the premix flow control valve 4-*a* connected to the premix burner 2-*a* operating for combustion at a predetermined fuel-air ratio is held constant, and the closed premix flow control valve 4-*b* is opened (or the fully open premix flow control valve 4-*b* is closed), the opening of the premix pressure control valve 6 is changed at the predetermined change rate so that the variation of the pressure in the fuel pipe 5 attributable to the variation of the flow of the fuel is suppressed or absorbed. Therefore, the pressure variation in the fuel pipe 5 can be suppressed in a short time and hence the time necessary for making the gas-turbine combustor reach a rated operating state (or an inoperative state) can be shortened and the range of variation of the output of the plant can be narrowed. The unstable burning operation of the premix burners during the fuel supply mode changing operation can be avoided and the emission of the unburned fuel can be reduced by holding the fuel-air ratio for the operating premix burners.

Figure 6:
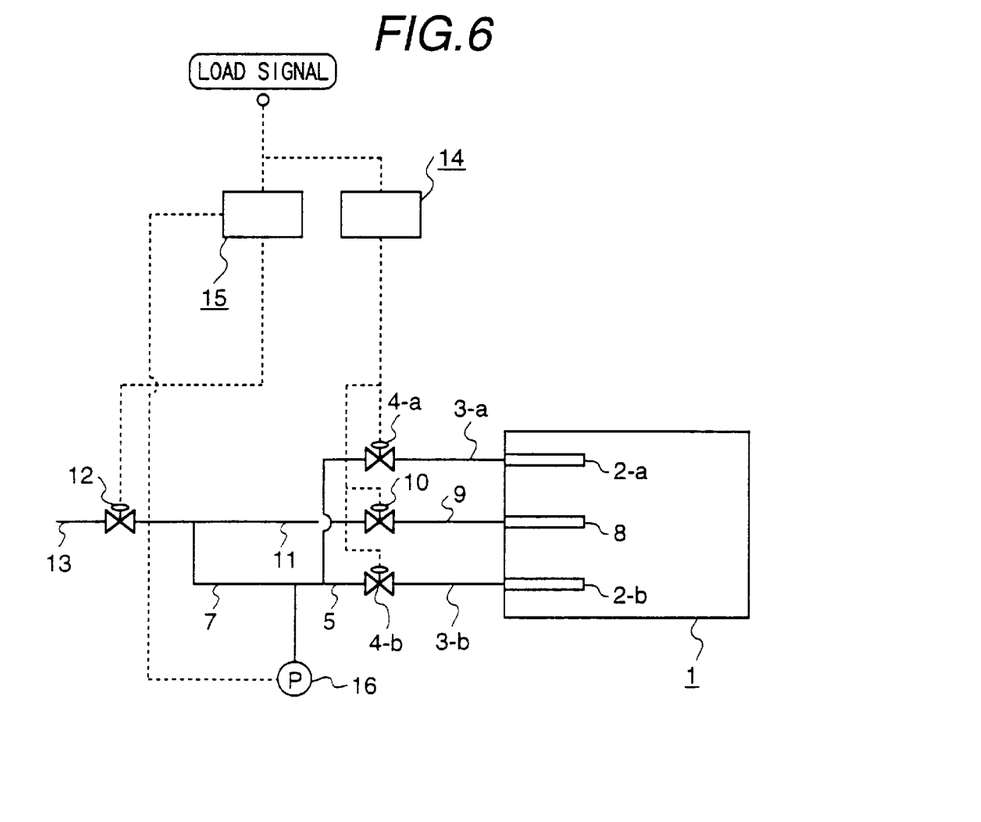
FIG. 6 is a diagrammatic view of a gas-turbine combustor in another embodiment according to the present invention.

FIG. 6 shows a gas-turbine combustor in another embodiment according to the present invention, which is provided with a single pressure control valve 12 instead of the pressure control valves 6 and 12 employed in the gas-turbine combustor of FIG. 1. Fuel pipes 3-*a* and 3-*b* connected to premix nozzles 2-*a* and 2-*b*, a fuel pipe 9 connected to a diffusion nozzle 8, a main fuel pipe is connected to the fuel pipes 3-*a*, 3-*b* and 9, a pressure control valve 12 is placed in the main fuel pipe 13, and the main fuel pipe 13 is branched below the pressure control valve 12 into a fuel pipe connected to the fuel pipes 3-*a* and 3-*b* to supply the fuel to premix burners, and a fuel pipe 11 connected to the fuel pipe 9 to supply the fuel to a diffusion burner.

In normal operation, pressures in the fuel pipes are measured by pressure sensors, and the pressure control valve 12 is controlled in a feedback control mode on the basis of the output signals of the pressure sensors.

While the load on the gas-turbine combustor is low, a valve 10 is opened to supply the fuel to the diffusion nozzle 8 for diffusion combustion. For example, a diffusion burner provided with the diffusion nozzle 8 is used as a pilot burner. As the load on the gas-turbine combustor increases, a valve 4-*a* is opened to supply the fuel to the premix nozzle 2-*a*. As the load on the gas-turbine combustor further increases, a valve 4-*b* is opened to supply the fuel also to the premix nozzle 2-*b*.

If necessary, the valve 10 is closed to stop fuel supply to the diffusion nozzle 8 upon the increase of the load to a predetermined level and the gas-turbine combustor is operated in a premix combustion mode which is effective in reducing the emission of Nox.

Figure 7:
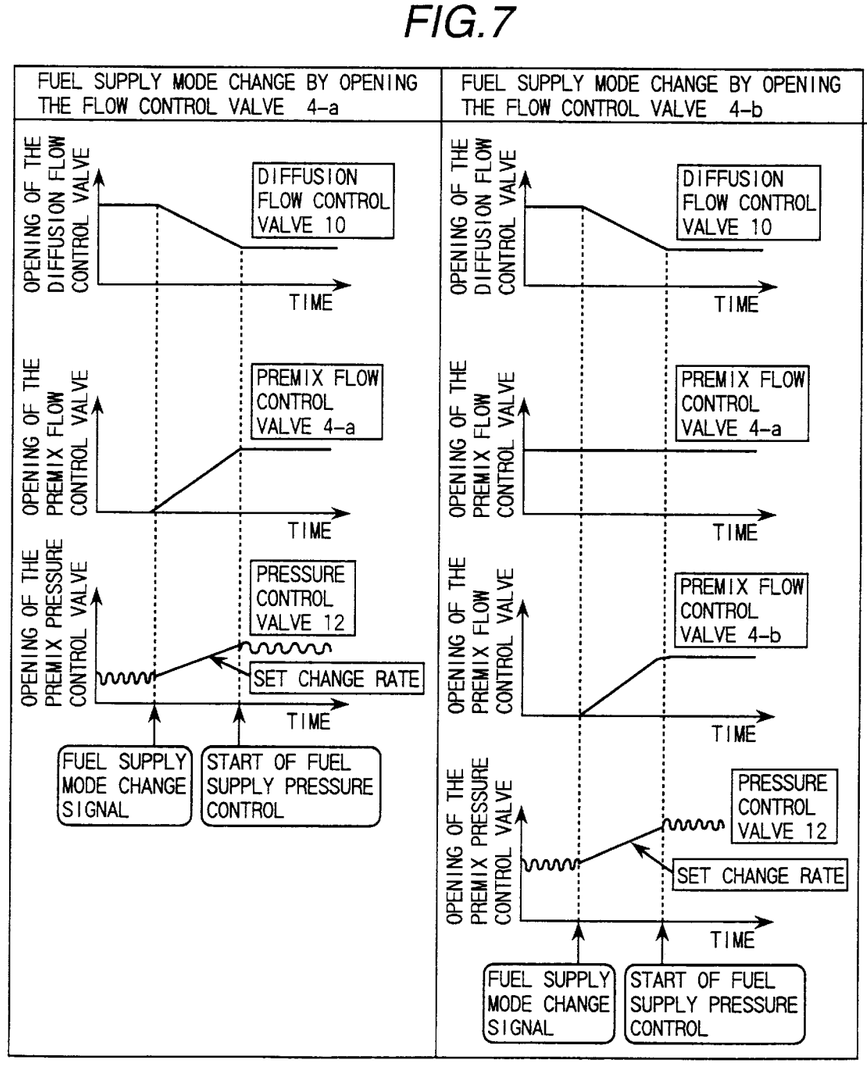
FIG. 7 is diagrams showing set values set by a pressure ratio setting device.

When using premix combustion by opening the valve 4-*a* in addition to diffusion combustion, the valves 10, 4-*a* and 4-*b* are operated in modes expressed by diagrams on the left-hand side of FIG. 7. The respective operating modes of the valves 10 and 4-*a* are similar to those illustrated in FIG. 5. The opening of the pressure control valve 12 is increased at a predetermined opening rate while the respective openings of the valves 10 and 4-*a* are varied. The valves 10, 4-*a* and 4-*b* are operated in modes expressed by diagrams on the right-hand side of FIG. 7, which is substantially similar to those illustrated in FIG. 5, when the number of the premix burners is increased. Thus, the variation of fuel pressure which occurs when the number of operating burners is changed can be quickly suppressed, so that the stable premix combustion can be achieved.

For example, the rate of changing the opening of the pressure control valve 12 when the valve 4-*a* is opened to change the operating mode of the gas-turbine combustor from a diffusion combustion mode to a diffusion-and-premix combustion mode may be greater than that of the pressure control valve 12 when the valve 4-*b* is opened to change the operating mode of the gas-turbine combustor from the diffusion-and-premix combustion mode to a premix combustion mode.

Figure 8:
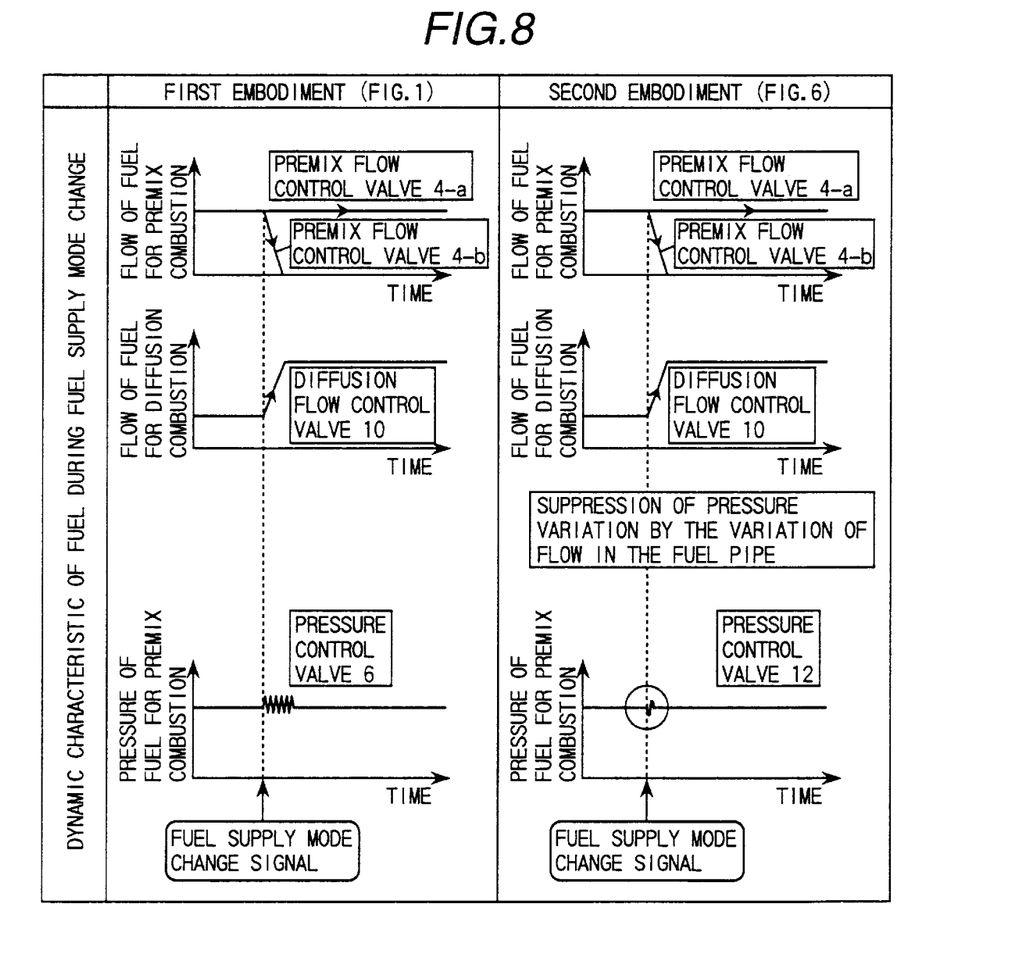
FIG. 8 is graphs showing fuel characteristics when fuel supply is changed.

A control operation to be carried out when one of the two operating premix burners is stopped will be described with reference to FIG. 8.

In the gas-turbine combustor shown in FIG. 1 having the premix fuel supply system provided with the pressure control valve 6 and the diffusion fuel supply system provided with the pressure control valve 12, the flow control valve 4-*b* is closed, the opening of the flow control valve 4-*a* is held constant, and the flow control valve 10 is opened. Then, the pressure in the fuel pipe between the pressure control valve 12 and the flow control valve 10 drops temporarily. Consequently, the flow of the fuel supplied to the diffusion burner increases gradually to a set flow as shown on the left-hand side in FIG. 7. When the flow control valve 4-*b* is closed, the fuel flow in the fuel pipe 5 varies, and pressure of the fuel supplied to the premix burner regulated by the pressure control valve 6 varies as shown in FIG. 7. This variation of the fuel supplied to the premix burner continues for a relatively long time before the variation settles and the flow is stabilized.

In the gas-turbine combustor shown in FIG. 6 provided with the premix fuel supply system and the diffusion fuel supply system connected by the single pressure control valve 12, the flow control valve 4-*b* is closed, the opening of the flow control valve 4-*a* is held constant, and the flow control valve 10 is opened. When the flow control valve 4-*b* is closed, the flow of the fuel in fuel pipes 5 and 7 varies and the pressures of the fuel in the pipes 5 and 7 rise. On the other hand, the flow of the fuel in a pipe 11 varies and the pressure of the fuel in the pipe 11 drops when the flow control valve 10 is opened. The variation of the fuel pressure in the pipes 5 and 7 and that of the same in the pipe 11 cancel out each other, and the pressure of the fuel for premix combustion controlled by the pressure control valve 12 varies as shown in FIG. 7. As shown in FIG. 7, this variation of the pressure of the fuel for premix combustion settles in a short time and hence the variation of the flow can be quickly suppressed.

Thus, the pressure variation which occurs when changing the fuel supply mode can be suppressed in a short time by controlling the pressure of the fuel supplied to the combustion nozzles by the pressure control valve 12 placed in the main fuel pipe 13, whereby stable combustion can be achieved. During the change of the fuel supply mode, the pressure variation can be further quickly suppressed by closing the pressure control valve 12 at the foregoing predetermined change rate.

Increase of the volume of the internal space of the fuel pipe between the pressure control valve 12 and the flow control valve 10 and the increase of the opening of the flow control valve 10 for supplying the fuel to the diffusion burner are effective in making the pressure in the fuel pipes 5 and 7 and the pressure in the fuel pipe 11 cancel out each other smoothly.

Thus, in this embodiment, the fuel pipes for supplying the fuel to the premix burners and the fuel pipe for supplying the fuel to the diffusion burner are connected to the single pressure control valve 12 to make the fuel pressure variation in the premix combustion system and the fuel pressure variation in the diffusion combustion system cancel out each other when changing the fuel supply mode, so that the variation of the flow in the fuel pipes can be suppressed in a short time, the total flow of the fuel between the pressure control valve 12 and the flow control valves 4-*a*, 4-*b* and 10 varies in a narrow range and hence the fuel can be stably supplied.

Figure 9:
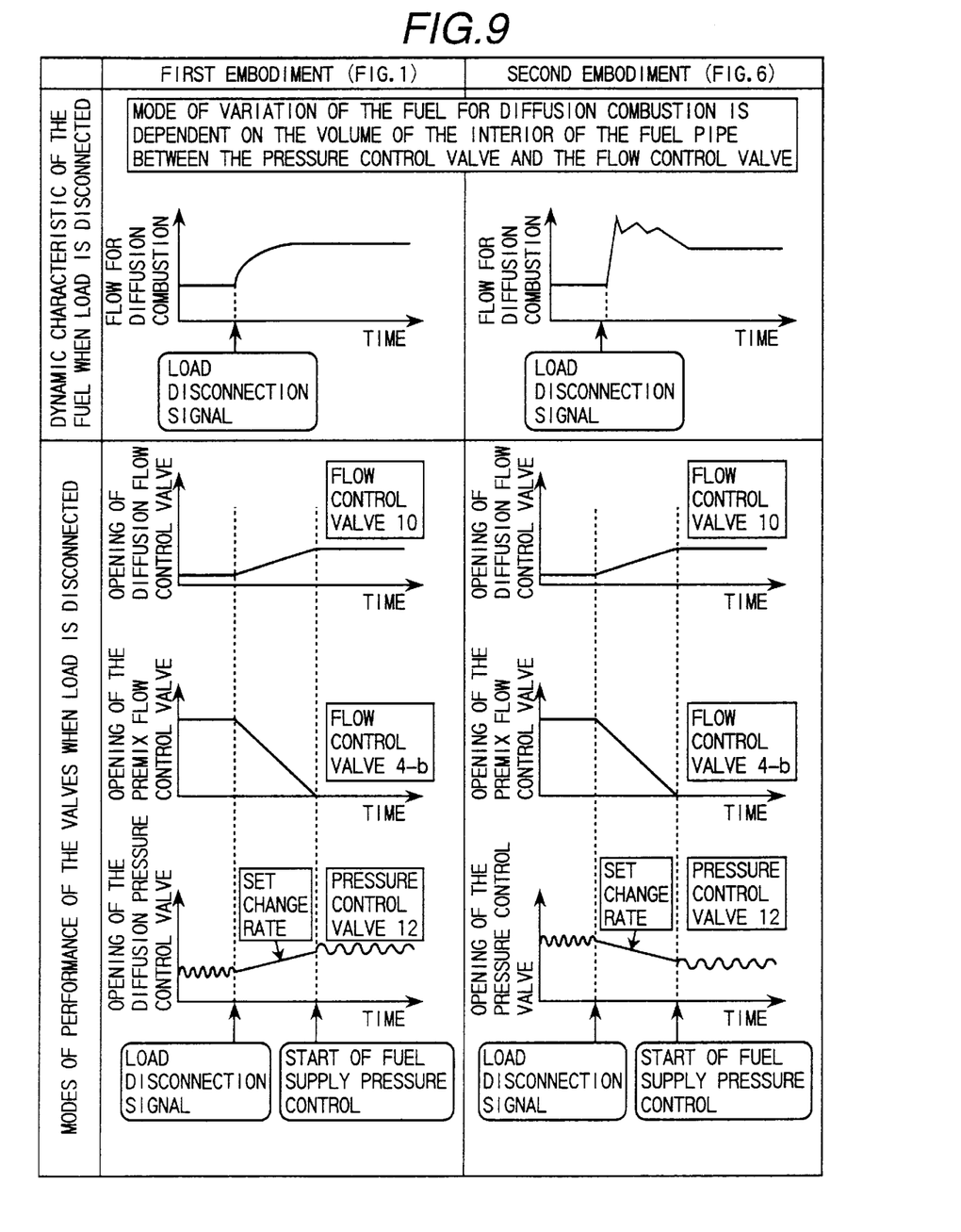
FIG. 9 is diagrams showing the opening of valves when load is disconnected.

A mode of operation of the gas-turbine combustor when the load is disconnected from the gas-turbine combustor will be described with reference to FIG. 9 showing the operations of the valves when a load disconnection signal is given and the operating mode of the gas-turbine combustor changes from a diffusion-and-premix combustion mode to a diffusion combustion mode in which fuel supply to the premix nozzles is stopped. In FIG. 9, the operations of the valves of the gas-turbine combustor shown in FIG. 1 provided with the two pressure control valves respectively for the premix nozzles and the diffusion nozzle are expressed by diagrams on the left-hand side, and the operations of the valves of the gas-turbine combustor shown in FIG. 6 provided with the single pressure control valve for both the premix nozzles and the diffusion nozzle are expressed by diagrams on the right-hand side.

As shown in an upper section of FIG. 1, the effect of the stop of premix combustion in response to the disconnection of the load on the flow of the fuel to the diffusion nozzle is greater in the gas-turbine combustor shown in FIG. 6 in which the main fuel pipe is branched into the fuel pipe for supplying the fuel to the premix nozzles and the fuel pipe for supplying the fuel to the diffusion nozzle at a position below the pressure control valve 12 than in the gas-turbine combustor shown in FIG. 1.

In the gas-turbine combustor shown in FIG. 1, the flow control valves 4-*a* and 4-*b* connected to the premix nozzles are closed and, at the same time, the flow control valve 10 connected to the diffusion nozzle is opened when a load disconnection signal is provided, and the opening of the pressure control valve 12 for controlling the pressure of the fuel to be supplied to the diffusion nozzle is increased at a predetermined change rate.

In the gas-turbine combustor shown in FIG. 6, the flow control valves 4-*a* and 4-*b* connected to the premix nozzles are closed, the flow control valve 10 connected to the diffusion nozzle is opened when a load disconnection signal is provided, and the opening of the pressure control valve 12 is decreased at a predetermined change rate.

Thus, the variation of the pressure in the fuel supply pipes can be suppressed in a short time even in a state where the load is disconnected and the operating made of the gas-turbine combustor is changed suddenly from the diffusion-and-premix combustion mode to the diffusion combustion mode.

What is claimed is:

1. A gas-turbine combustor provided with a plurality of premix burners and one diffusion burner, and capable of varying the number of the operating premix burners according to the variation of load thereon, said combustor comprising:

fuel pipes connected to the burners;

fuel flow control valves placed respectively in the fuel pipes;

pressure control valves placed in a main fuel pipe connected to the fuel pipes for the premix burners and the fuel pipe for the diffusion burner, respectively, to control pressures in the fuel pipes; and a fuel distribution ratio setting device for controlling the respective openings of the flow control valves according to load; and a pressure ratio setting device containing means for controlling the respective openings of the pressure control valves when the number of the operating premix burners is changed.

2. The gas-turbine combustor according to claim 1, wherein the pressure ratio setting device includes means for varying the openings of the pressure control valves at a predetermined rate in a period in which the opening of each of the flow control valves for supplying the fuel to the premix burners to be started or to be stopped is varied between zero and a predetermined value when increasing or decreasing the number of the operating premix burners from the number of the operating premix burners in a premix combustion mode in which the diffusion burner and a predetermined number of the premix burners are in operation.

3. The gas-turbine combustor according to claim 2, wherein the pressure ratio setting device includes means for controlling the openings of the pressure control valves so as to suppress pressure variation in the fuel pipes in a period in which the opening of each of the flow control valves for supplying the fuel to the premix burners to be started or to be stopped when increasing or decreasing the number of the operating premix burners from the number of the operating premix burners in a premix combustion mode in which the diffusion burner and a predetermined number of the premix burners are in operation.

* * * * *